US008214208B2

(12) United States Patent
Mallett et al.

(10) Patent No.: US 8,214,208 B2
(45) Date of Patent: Jul. 3, 2012

(54) METHOD AND SYSTEM FOR SHARING PORTABLE VOICE PROFILES

(75) Inventors: Jacqueline Mallett, Cambridge, MA (US); Sunil Vemuri, Boston, MA (US); N. Rao Machiraju, Ventura, CA (US)

(73) Assignee: Reqall, Inc., Moffet Field, CA (US)

( * ) Notice: Subject to any disclaimer, the term of this patent is extended or adjusted under 35 U.S.C. 154(b) by 1182 days.

(21) Appl. No.: 11/536,117

(22) Filed: Sep. 28, 2006

(65) Prior Publication Data
US 2008/0082332 A1 Apr. 3, 2008

(51) Int. Cl.
*G10L 15/00* (2006.01)
(52) U.S. Cl. .................................. 704/231; 704/235
(58) Field of Classification Search ........... 704/231–236
See application file for complete search history.

(56) References Cited

U.S. PATENT DOCUMENTS

| | | | |
|---|---|---|---|
| 6,195,641 B1* | 2/2001 | Loring et al. | 704/275 |
| 6,263,308 B1* | 7/2001 | Heckerman et al. | 704/231 |
| 6,785,647 B2* | 8/2004 | Hutchison | 704/231 |
| 7,035,788 B1* | 4/2006 | Nakajima et al. | 704/9 |
| 7,099,824 B2* | 8/2006 | Kushida et al. | 704/231 |
| 7,099,825 B1* | 8/2006 | Cook | 704/251 |
| 7,174,298 B2* | 2/2007 | Sharma | 704/270.1 |
| 7,224,981 B2* | 5/2007 | Deisher et al. | 455/456.1 |
| 7,302,391 B2* | 11/2007 | Reding et al. | 704/246 |
| 2002/0065652 A1* | 5/2002 | Kushida et al. | 704/231 |
| 2002/0156626 A1* | 10/2002 | Hutchison | 704/231 |
| 2003/0023431 A1* | 1/2003 | Neuberger | 704/231 |
| 2003/0065721 A1* | 4/2003 | Roskind | 709/204 |
| 2003/0120486 A1* | 6/2003 | Brittan et al. | 704/231 |
| 2003/0163308 A1* | 8/2003 | Matsuo | 704/231 |
| 2003/0182113 A1* | 9/2003 | Huang | 704/231 |
| 2003/0220975 A1* | 11/2003 | Malik | 709/205 |
| 2004/0186714 A1* | 9/2004 | Baker | 704/236 |
| 2004/0260701 A1* | 12/2004 | Lehikoinen et al. | 707/10 |
| 2005/0097440 A1* | 5/2005 | Lusk et al. | 715/500.1 |
| 2005/0119894 A1* | 6/2005 | Cutler et al. | 704/270 |
| 2005/0171926 A1* | 8/2005 | Thione et al. | 707/1 |
| 2005/0249196 A1* | 11/2005 | Ansari et al. | 370/352 |
| 2005/0286546 A1* | 12/2005 | Bassoli et al. | 370/432 |
| 2006/0053014 A1* | 3/2006 | Yoshizawa | 704/256.4 |
| 2007/0038436 A1* | 2/2007 | Cristo et al. | 704/9 |
| 2007/0174399 A1* | 7/2007 | Ogle et al. | 709/206 |
| 2007/0266079 A1* | 11/2007 | Criddle et al. | 709/203 |

* cited by examiner

*Primary Examiner* — Douglas Godbold
(74) *Attorney, Agent, or Firm* — Tarek N. Fahmi

(57) ABSTRACT

An embodiment of the present invention provides a speech recognition engine that utilizes portable voice profiles for converting recorded speech to text. Each portable voice profile includes speaker-dependent data, and is configured to be accessible to a plurality of speech recognition engines through a common interface. A voice profile manager receives the portable voice profiles from other users who have agreed to share their voice profiles. The speech recognition engine includes speaker identification logic to dynamically select a particular portable voice profile, in real-time, from a group of portable voice profiles. The speaker-dependent data included with the portable voice profile enhances the accuracy with which speech recognition engines recognize spoken words in recorded speech from a speaker associated with a portable voice profile.

24 Claims, 11 Drawing Sheets

METHOD AND SYSTEM FOR SHARING PORTABLE VOICE PROFILES

FIELD OF THE INVENTION

The present invention relates generally to speaker-dependent speech recognition systems. More particularly, the invention relates to an architecture for sharing customized, portable voice profiles, for use with varied speech recognition engines, amongst different applications and users.

BACKGROUND

Speech recognition systems, which can generally be defined as a set of computer-implemented algorithms for converting a speech or voice signal into words, are used in a wide variety of applications and contexts. For instance, speech recognition technology is utilized in dictation applications for converting spoken words into structured, or unstructured, documents. Phones and phone systems, global positioning systems (GPS), and other special-purpose computers often utilize speech recognition technology as a means for inputting commands (e.g., command and control applications).

Speech recognition systems can be characterized by their attributes (e.g., speaking mode, speaking style, enrollment or vocabulary), which are often determined by the particular context of the speech recognition application. For example, speech recognition systems utilized in dictation applications often require that the user of the application enroll, or provide a speech sample, to train the system. Such systems are generally referred to as speaker-dependent systems. Speaker-dependent speech recognition systems support large vocabularies, but only one user. On the other hand, speaker-independent speech recognition systems support many users without any enrollment, or training, but accurately recognize only a limited vocabulary (e.g., a small list of commands, or ten digits). Speech recognition systems utilized in dictation applications may be designed for spontaneous and continuous speech, whereas speech recognition systems utilized for recognizing voice commands (e.g., voice dialing on mobile phones) may be designed to recognize isolated-words.

Because speech recognition systems generally tend to be customized for use in a particular context or application, any user-specific, location-specific, or customized data (e.g., speaker-dependent enrollment/training data, or user-specific settings) that are generated for use with one speech recognition system or application are not easily shared with another speech recognition system or application. For example, many speech recognition systems in use with dictation applications can be improved over time with active or passive training. As errors are identified and corrected, the speech recognition system can "learn" from the identified errors, and prevent such errors from reoccurring. Other speech recognition systems benefit from user specific settings, such as settings that indicate the gender of the speaker, nationality of the speaker, age of the speaker, etc. Unfortunately, such data (enrollment/training data and user settings) are not easily shared amongst speech recognition systems and/or applications.

In addition, speaker-dependent speech recognition systems do not work well in multi-user or conversational settings, where more than one person may contribute to a speech recording or voice signal. For instance, a typical speaker-dependent speech recognition system is invoked with a particular voice or user profile. Accordingly, that particular user profile is used to analyze the entire voice recording. If a recording includes recorded speech from multiple users, a conventional speaker-dependent speech recognition system uses only one user profile to analyze the recorded speech of all of the speakers.

Furthermore, even in a particular speech recognition system is configured to use multiple voice profiles, there does not exist a system or method for easily locating and retrieving, the necessary voice profiles. For example, if a particular audio recording includes speech from persons A, B, C, D, E and F (where person A is the user of the speech recognition system) then it is necessary for the speech recognition system to locate and retrieve the voice profiles from persons A, B, C, D, E and F. It may be impractical to expect person A, the user of the speech recognition system, to ask each of persons B, C, D, E and F to provide a voice profile, particularly if person A is not acquainted with one or more persons. For example, if person A is directly acquainted with persons B and C, but only indirectly acquainted with persons D, E and F, then it may be awkward, or inconvenient, to ask persons D, E and F for their voice profiles. Moreover, as the number of people in the particular group increases, the time and energy required to gain access to the voice profiles becomes prohibitive. Consequently, there exists a need for an improved architecture for sharing voice profiles.

SUMMARY OF THE DESCRIPTION

An embodiment of the present invention provides a speech recognition engine that utilizes portable voice profiles for converting recorded speech to text. Each portable voice profile includes speaker-dependent data, and is configured to be accessible to a plurality of speech recognition engines through a common interface. A voice profile manager facilitates the exchange of portable voice profiles between members of groups who have agreed to share their voice profiles. The speech recognition engine includes speaker identification logic to dynamically select a particular portable voice profile, in real-time, from a group of portable voice profiles. The speaker-dependent data included with the portable voice profile enhances the accuracy with which speech recognition engines recognize spoken words in recorded speech from a speaker associated with a portable voice profile.

In another aspect, the present invention provides a means for sharing portable voice profiles amongst a distributed system of speech recognition devices. Accordingly, each speech recognition device includes a voice profile manager that communicates with other devices to facilitate the exchange of voice profiles.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DESCRIPTION

Reference will now be made in detail to an implementation consistent with the present invention as illustrated in the accompanying drawings. Wherever possible, the same reference numbers will be used throughout the drawings and the following description to refer to the same or like parts. Although discussed with reference to these illustrations, the present invention is not limited to the implementations illustrated therein. Hence, the reader should regard these illustrations merely as examples of embodiments of the present invention, the full scope of which is measured only in terms of the claims following this description.

Figure 1:
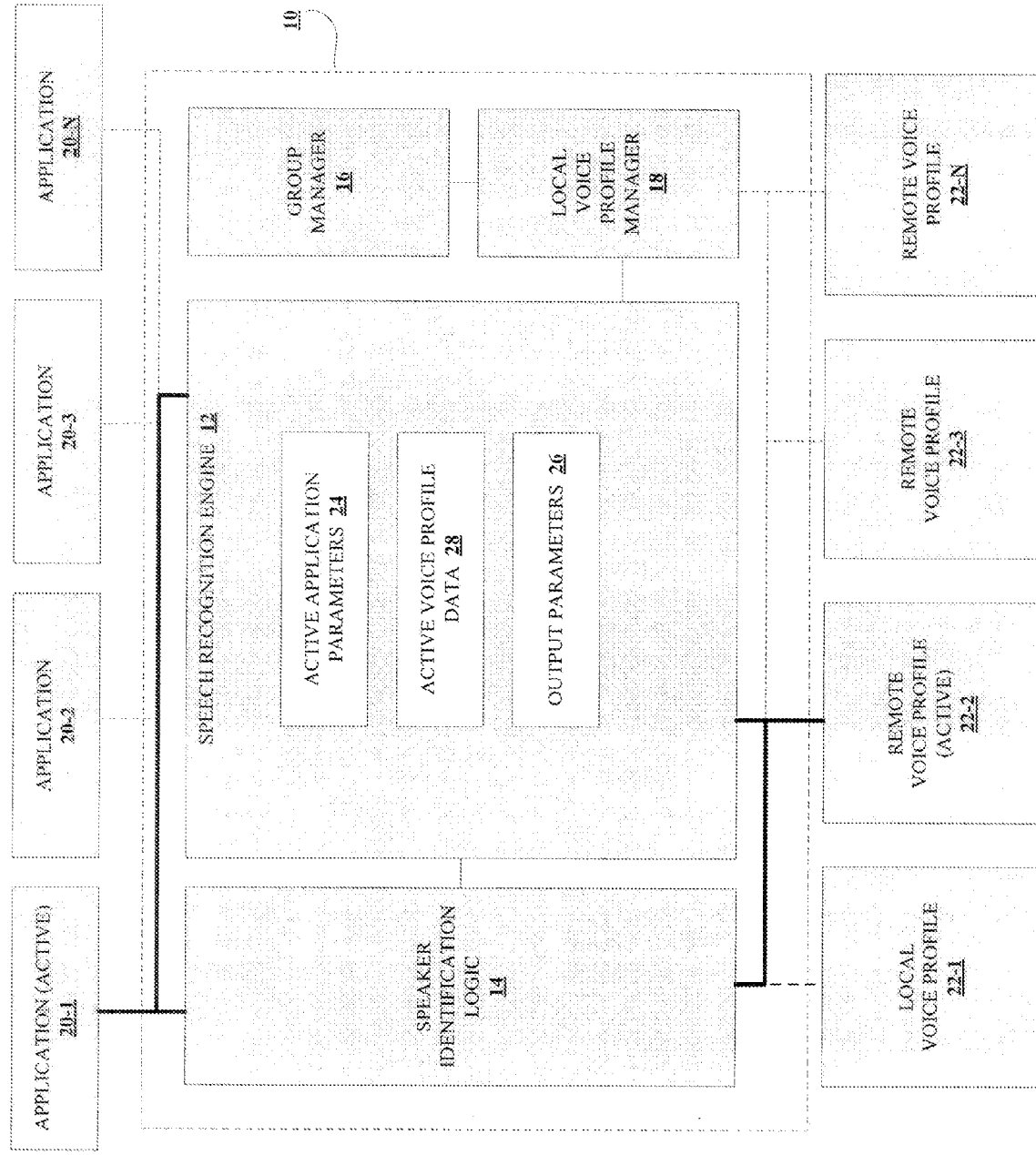
FIG. 1 depicts a block diagram of a speech recognition system for use with multiple portable voice profiles, according to an embodiment of the invention.

Referring now to FIG. 1, a block diagram of a speech recognition system 10, consistent with an embodiment of the invention, is shown. The speech recognition system 10 includes a speech recognition engine 12 and speaker identification logic 14. In addition, the speech recognition system 10 includes a group manager 16 and a local voice profile manager 18. The speech recognition system 10 is configured to work with a variety of speech-enabled applications (20-1 through 20-N), for example, such as a dictation application, a telecommunications application (e.g., voice over Internet Protocol, or VoIP application), or any of a variety of command and control applications (e.g., voice dialing or GPS control). In addition, the speech recognition system 10 is configured to work with multiple portable voice profiles (22-1 through 22-N). As will be described in greater detail below, one function of the group manager 16 is to facilitate defining or selecting groups and exchanging voice profiles with members within the groups.

In one embodiment of the invention, the speech recognition system 10 is invoked to work with an active application 20-1. The active application 20-1 may be configured to automatically invoke the speech recognition system 10, or alternatively, a user of the active application may manually select to invoke the speech recognition system 10. The active application 20-1 may pass one or more parameters 24 to the speech recognition engine 12, such that the speech recognition engine 12 can optimally self-configure itself to provide the highest level of accuracy in recognizing speech (e.g., spoken words) in a voice signal received from or recorded by the active application 20-1. The active application parameters 24 may include, for example, values for such application settings as, speaking mode (e.g., isolated-word or continuous speech), or speaking style (e.g., read speech or spontaneous speech). In addition, the active application 20-1 may pass one or more output parameters 26 to the speech recognition engine 12. Alternatively, the output parameters 26 may be user-definable, for example, through a user-interface (not shown) of the speech recognition system 10. The output parameters 26 may determine the format of the output created by the speech recognition engine 12.

In addition to working with a variety of applications, the speech recognition system 10 is configured to work with multiple portable voice profiles (22-1 through 22-N). Each portable voice profile is associated with a particular user or speaker, where the terms "user" and "speaker" are used synonymously herein. A portable voice profile includes speaker-dependent data, such as the acoustic characteristics of a speaker, to improve the accuracy with which a compatible speech recognition engine 12 recognizes speech recorded by a particular speaker that is associated with a particular voice profile. In one embodiment of the invention, each portable voice profile may include enrollment/training data. For example, each time a voice profile is used with a particular speech recognition engine, the voice profile may be manually or automatically updated as errors are identified and corrected by a speaker. This data can be utilized later to prevent the same type of error or errors from reoccurring. Accordingly, unlike a conventional voice profile that includes data derived from use with a single speech recognition engine, a voice profile consistent with the invention may include data derived from use with a variety of speech recognition engines and a variety of applications.

In addition to enrollment/training data, a voice profile may include speaker-dependent parameters or settings that are used by various speech recognition systems to improve recognition accuracy. For example, such settings may include values to indicate the gender of the speaker, nationality of the speaker, age of the speaker, acoustic characteristics of the speaker, characteristics for different speaking environments, or any other speaker-dependent attributes utilized by speech recognition engines to improve speech recognition accuracy. In addition, the speaker-dependent parameters may include data used for recognizing text in noisy and/or noiseless environments.

In one embodiment of the invention, each voice profile has a common interface (not shown), such that the data included within each voice profile can be easily accessed by a wide variety of speech recognition engines. For example, in one embodiment of the invention, portable voice profiles and associated data may be accessible through common function calls. Such function calls may be part of an application programming interface (API). Accordingly, any speech recognition engine implementing the API will have access to the portable voice profiles.

The speaker identification logic 14, in one embodiment of the invention, samples the input voice signal and then analyzes the voice signal for the purpose of identifying the speaker. For example, the speaker identification logic 14 may compare portions of the voice signal to speaker-dependent data from each accessible voice profile to determine whether the analyzed voice has a corresponding portable voice profile accessible. In a particular voice captured in the voice signal is associated with a portable voice profile accessible to the speech recognition engine 12, then the speech recognition engine 12 dynamically invokes the matching portable voice profile (e.g., the active voice profile 22-2), and utilizes data from the matching portable voice profile to enhance or improve the speech recognition process. In contrast to conventional speaker-dependent speech recognition engines, a speech recognition engine consistent with the invention can dynamically switch between portable voice profiles in real time during the speech recognition process. For example, when the speaker identification logic 14 identifies a change in the voice on the recorded voice signal, the speaker identification logic 14 can dynamically identify the new voice and match the new voice to a portable voice profile, if one exists and is accessible. Accordingly, different voice profiles are used for different speakers to improve the accuracy of the speech recognition process.

The group manager 16 facilitates the establishment and management of groups. For example, in one embodiment of the invention, each user may have his or her own portable voice profile (e.g., local voice profile 22-1) for use with his or her own applications and speech recognition engine or engines. Each user, by means of the group manager 16, can establish or select one or more groups, and then add other users to the group. For instance, if a particular user frequently records conversations with a select group of people and the user would like to share his or her voice profile with those people, then the user can establish a group to include those people. Alternatively, the user may select to join the group if the group has already been established. In one embodiment of the invention, group definitions may be defined by some higher level administrative application, such that each user selects from a list of groups that have been predefined. This facilitates common naming of groups, so that members can easily find the correct group without establishing multiple names for the same group.

In one embodiment of the invention, when a group is initially established, it may be designated as a secure group. Accordingly, only members who have been authorized to join a secure group may do so. For example, a group administrator may use a higher level administrative application (e.g., executing on a secure server, or a specialized peer device) to establish a secure group, and to designate the members who are allowed to join the secure group. Accordingly, each member's group manager 16 may exchange information via secure cryptographic communication protocols with the higher level administrative application when establishing membership privileges within the group. Once a member has been authenticated and granted access to the secure group, information is shared amongst members of the secure group just as with any other group.

After joining a particular group, in one embodiment of the invention, the group manager 16 enables a user to establish connections or links with other users. A unilateral connection exists when one user has requested a connection with another user, and a mutual or bilateral connection exists when both users have requested, or in some way acknowledged a desire to be connected. Accordingly, access privileges to voice profiles may be dependent upon the type of connection—unilateral or bilateral—that has been established between two users. In one embodiment, a mutual connection establishes the requisite sharing privileges, such that each user grants the other access to his or her voice profile by establishing a mutual connection. A unilateral connection may or may not establish the requisite sharing privileges. In one embodiment, a user may have to configure access privileges for unilateral connections. For example, the group manager 16 may enable a user to grant or deny permission to unilaterally connected users to use, or otherwise access, his or her local portable voice profile 22-1. In addition, the group manager 16 may establish the depth to which a user is willing to share his or voice profile. For example, if user A is connected to user B, and user B is connected to user C, such that user A has only an indirect connection to user C through user B, user A may allow his or her voice profile to be shared with user C by setting access privileges to the proper depth. In this case, a depth level setting of two would allow user C to access user A'a voice profile.

In one embodiment of the invention, the local voice profile manager 18 includes the necessary networking, communication and routing protocols to discover members of a group. For example, after a user has selected a particular group, the speech recognition system 10 may use a discovery communication protocol to query other speech recognition systems that have been designated as being in that same group. In this manner, the speech recognition system 10 can determine the users that are members of a selected group. Accordingly, the system 10 may present or display (e.g., in a graphical user-interface) each member of a particular group for selection by the user. To avoid overburdening network resources, discovery protocols may only search to an appropriate depth or level. For example, only members of a group within three "hops" of the user may be identified, where a "hop" represents a nodal connection between the user's device and another user's device. In this manner, a user may find all other members of a selected group that are within so many "hops" of the user.

In addition, group membership and/or voice profile sharing privileges may be established based on simple set logic or Boolean logic. For example, a user's voice profile may automatically be shared with another user or entity if the user's existing group membership satisfies a Boolean-valued function. For instance, a user may automatically be designated as a member of a particular group, if the user is a member of one or more other groups. If user A is a member of Group "New York City" and group "over age 25" then user A may automatically be designated as a member of group "Hertz Car Rental." In one embodiment, a user may be able to control the extent to which he or she is automatically added to groups through access privileges.

Once a connection with another user is established and the requisite access privileges to the voice profiles have been granted, then the local voice profile manager 18 automatically arranges for the exchange of the portable voice profiles. The local voice profile manager 18 may be configured to communicate with remove voice profile managers for the exchange of voice profiles. As used herein, "local" simply means that the voice profile manager is executing on the user's device, whereas "remote" means that the voice profile manager is executing on another user's device. Such communications may occur automatically, for example, over a network such as the Internet. Accordingly, the group manager 16, in conjunction with the local voice profile manager 18, facilitates the automatic sharing of portable voice profiles amongst and between users who have established connections via the group manager. If, for example, a particular user (e.g., user A) has established a group with members A, B, C, D and E, then user A's profile manager 18 will automatically determine the locations of the other user's (e.g., users B, C, D and E) voice profiles. The actual exchange of the voice profiles is facilitated by networking, communication and/or routing protocols, which may be part of the local voice profile manager 18, or another subsystem (not shown).

As illustrated in FIG. 1, the local portable voice profile 22-1 is a portable voice profile that is associated with a user/owner of the speech recognition engine and applications, whereas a remote voice profile is a profile received from another user, who does not own and may or may not regularly use the particular speech recognition engine 12. Accordingly, each remote voice profile is retrieved from a remote device or system used by a member of a group with whom the user has established a connection. One advantage of the system is its distributed nature. Information about the various groups can be used to manage the overall load of the distributed system, for example, by maintaining locally enforced limits of group size. In one embodiment of the invention, group size can be calculated by the larger system (e.g., by taking into consideration engineering estimates and measurements of the load on the entire system) to reflect the availability of computation and network resources.

The local voice profile manager 18 may monitor the age of each remote portable voice profile (22-2, 22-3 and 22-N) so as to ensure that each remote portable voice profile is kept recent and up-to-date. For example, the local voice profile manager 18 may periodically communicate requests to one or more remote voice profile managers, from which a remote voice profile was received, requesting the remote voice profile managers to update remote voice profiles if necessary. Accordingly, if an update is required, a remote voice profile manager may communicate an updated remote portable voice profile to the local voice profile manager 18.

In one embodiment of the invention, voice profiles may be exchanged prior to being invoked by an application or speech recognition engine. Accordingly, when a user selects a particular group to be used in connection with recording a conversation through a particular application (e.g, a Voice over Internet Protocol (VoIP) phone), the voice profiles associated with the members of that group are ready to be used. Alternatively, voice profiles may be exchanged in real time, for example, when a conversation is initiated through a particular application, or when a recording device is configured and enabled to capture a conversation between two or more users. For example, a group may be automatically established when users identify themselves to a call conferencing application, which uses a group manager 16 and voice profile manager 18 to retrieve the appropriate voice profiles in real-time.

In one embodiment, the group manager 16 and/or voice profile manager 18 execute as stand alone applications, thereby enabling the establishment of groups and the exchange of voice profiles independent of any particular user application. Alternatively, the group manager 16 and/or voice profile manager may be integrated with and execute as part of a local user's application. In one embodiment of the invention, the group manager 16 and/or voice profile manager 18 may be implemented as, or integrated with, an instant messaging or social networking platform. Accordingly, an instant messaging or social networking platform may provide a foundation for the communication and messaging platform, such that the functions to facilitate exchanging portable voice profiles is an add-on service or component. Accordingly, the group manager 16 may be integrated in such a way that group definitions and member selections may be facilitated by means of the instant messaging or social networking platform.

Referring again to FIG. 1, in operation, the speech recognition engine 12 receives an audio signal from an active application 20-1. In one embodiment of the invention, the audio signal may be processed in real-time or near real-time, for example, as the signal is being captured. Alternatively, the audio signal may be captured by the active application and then processed by the speech recognition system 10 at a later time. In either case, the speaker identification logic 14 analyzes the audio signal to identify a speaker. Based on the identification of the speaker, a voice profile is invoked for processing the audio signal. As illustrated in FIG. 1, the speech recognition engine 12 utilizes active voice profile data 28 to enhance the accuracy of the speech recognition. If the speaker identification logic 14 cannot identify the speaker associated with a particular voice, for example, because there is no portable voice profile accessible for the speaker, then default settings or a default voice profile may be used. If, during the recognition process, the speaker identification logic 14 identifies a voice change, then the speaker identification logic 14 attempts to identify the new voice, and invoke the associated portable voice profile. In this manner, the speech recognition engine 12 continues to process the audio signal, and generates an output containing the recognized text of the captured or recorded audio signal.

Figure 2:
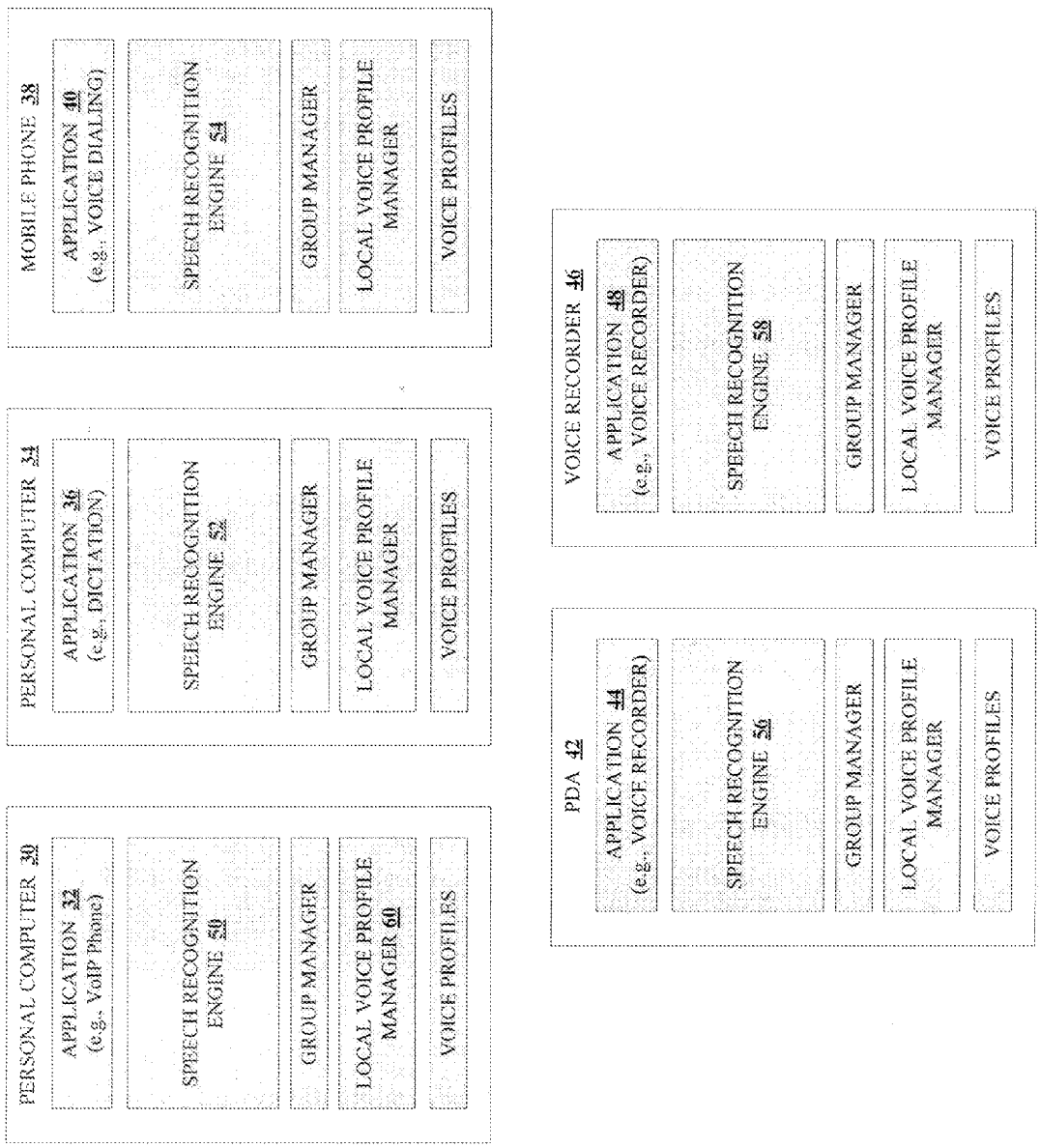
FIG. 2 depicts several speech recognition systems for use with multiple, portable voice profiles, according to various embodiments of the invention.

As illustrated in FIG. 2, in one embodiment, each speech recognition system may be configured to use only one type of application with its own customized speech recognition engine configured to utilize portable voice profiles. For example, the speech recognition systems shown in FIG. 2 include a personal computer 30 executing a VoIP phone application 32, a personal computer 34 executing a dictation application 36, a mobile phone 38 executing a voice dialing application 40, a personal digital assistant or PDA 42 executing a voice recorder application 44, and a voice recorder 46 with a voice recording application 48. Each individual device may have its own customized speech recognition engine. Furthermore, each device (30, 34, 38, 42 and 46), application (32, 36, 40, 44 and 48) and respective speech recognition engine (50, 52, 54, 56, 58) may be compatible with portable voice profiles. Therefore, in contrast to conventional speech recognition systems, a user who has a well developed voice profile, which includes data from extensive training with a dictation application (e.g., application 36) can use that voice profile with a voice recorder application 44 on a PDA 42, or in any other voice-enabled application that is configured to utilize portable voice profiles. Moreover, the voice profile can be shared with other users.

In one embodiment of the invention, each device may be configured to synchronize with other devices owned by the same user. For example, if all of the devices illustrated in FIG. 2 are owned by one user, any change made to one device may be automatically distributed to other devices. Accordingly, if the user has established a group and selected the group's members on one device (e.g., personal computer 30), and then later adds a member to the group, the change will be distributed to all other devices owned by the user. For example, the local voice profile manager 60 of one device may communicate (e.g., upload) device specific settings and information, including group, member, and voice profile information, to another device, such as mobile phone 38, or PDA 42. The communication between devices may occur over a wired connection (e.g., Ethernet, universal serial bus (USB) or FireWire) or wireless connection (e.g., Bluetooth or Wi-Fi®).

Figure 3:
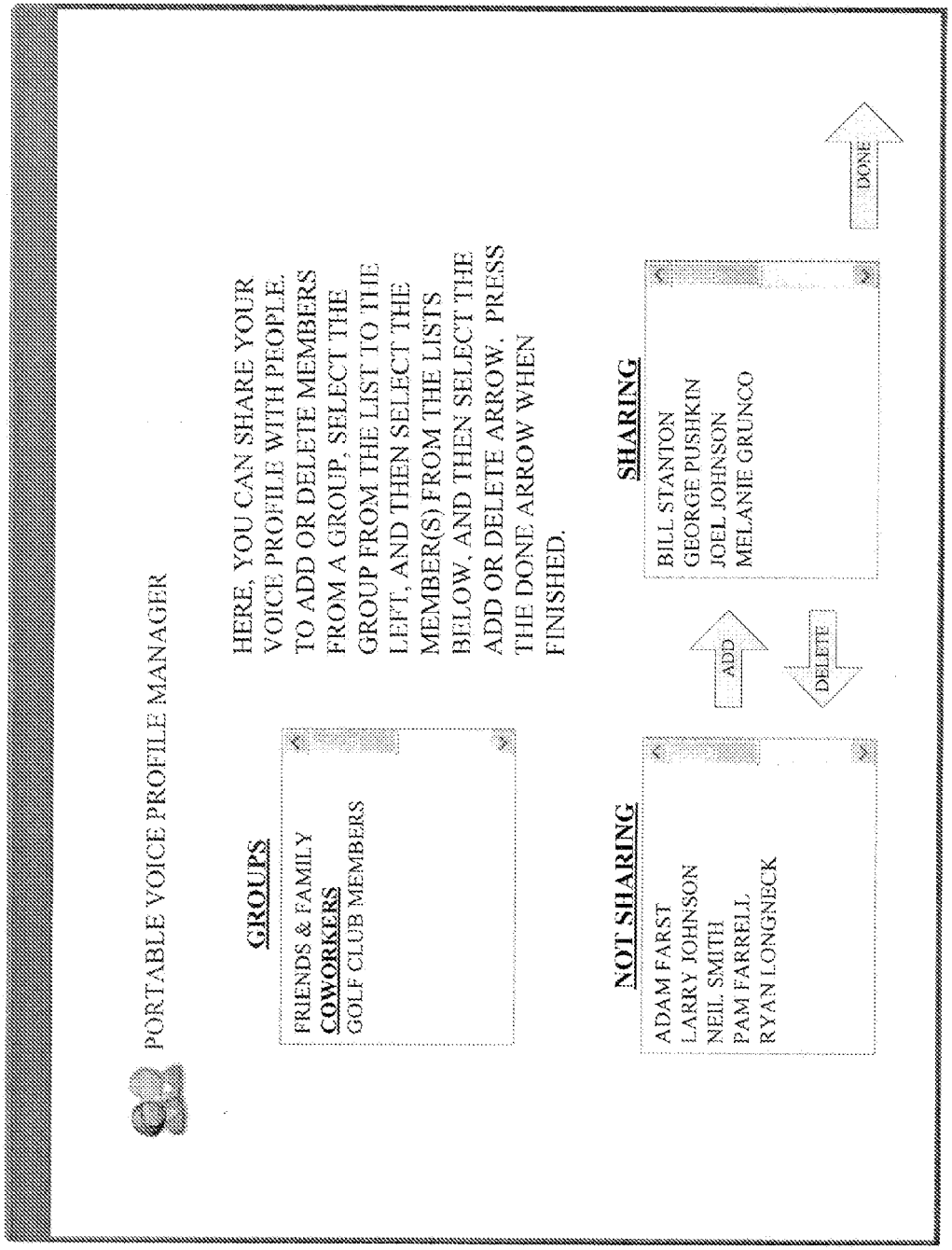
FIGS. 3 and 4 illustrate examples of user-interfaces for managing portable voice profiles for use with one or more speech recognition systems, according to embodiments of the invention.
Figure 4:
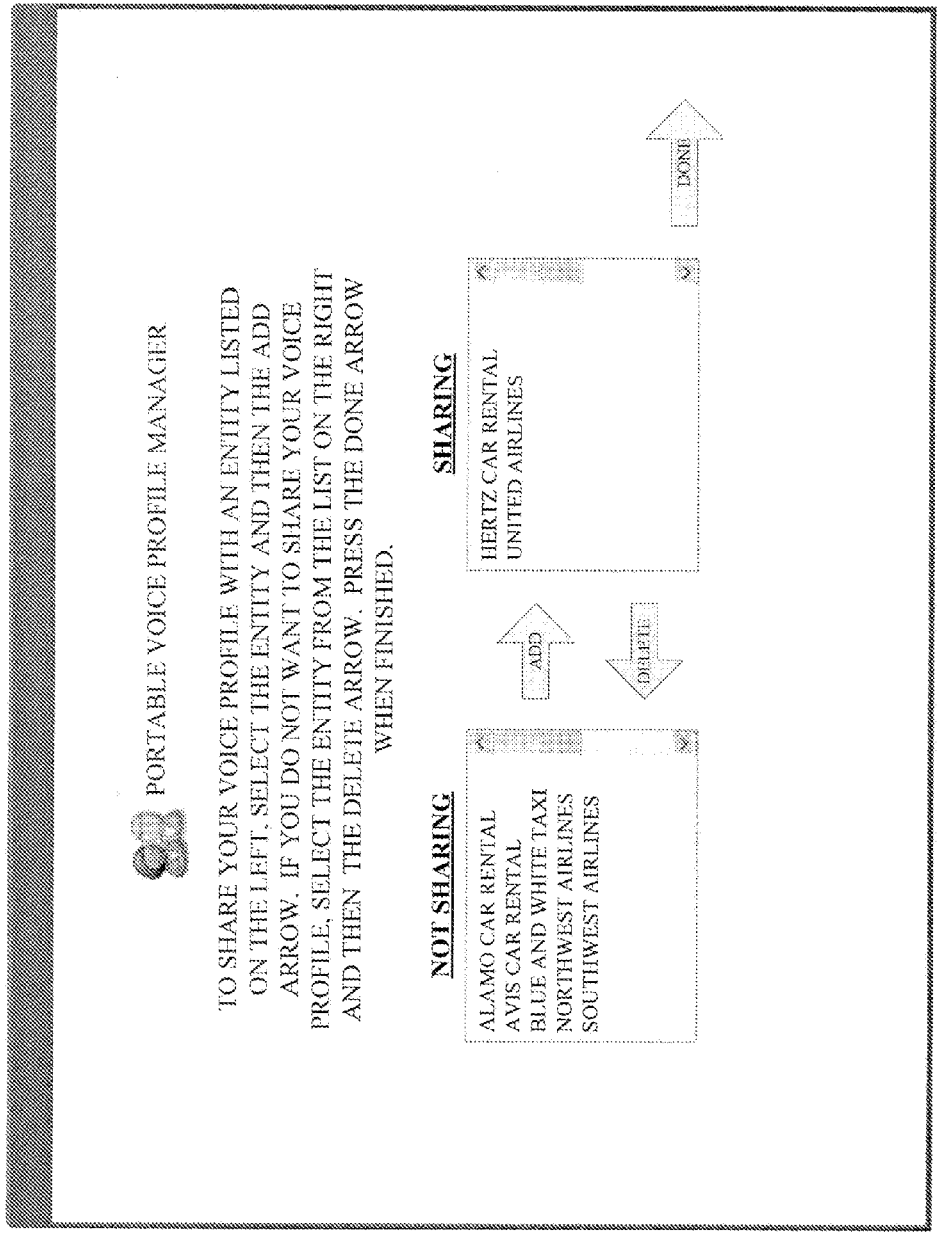

FIGS. 3 and 4 illustrate examples of user-interfaces for managing groups and associated portable voice profiles for use with one or more speech recognition systems, according to embodiments of the invention. As illustrated in FIG. 3, a group manager 16 may have a graphical user-interface for establishing and managing groups. Accordingly, the group manager user-interface may enable a user to define or select a group, such as those shown in FIG. 3 (e.g., FRIENDS & FAMILY, COWORKERS, and GOLF CLUB MEMBERS). Once a group is defined or selected, the user may select other users to be members of each particular group. In one embodiment, by selecting another user (e.g., BILL STANTON) to be a member of a group, the user is, by default, granting permission to the other user (e.g., BILL STANTON) to access his or her portable voice profile. Alternatively, as described briefly above, the user-interface may implement an alternative mechanism for granting access privileges to voice profiles, such that a member of a group is not automatically allowed access to a user's voice profile. In one embodiment, the system 10 automatically polls other user's devices to determine the members of a particular group, thereby enabling the user-interface to display members of a group for selection by the user.

FIG. 4 illustrates an example of a user-interface, according to an embodiment of the invention, for use with a voice profile service provider. For example, a user may select to upload his or her portable voice profile to a voice profile service provider. Once uploaded, the user can select to share his or her portable voice profile. As illustrated in FIG. 4, the user may select from a list of business entities, those entities with which the user would like to share his or her portable voice profile. Accordingly, if the user is a frequent caller to a particular business entity (e.g., United Airlines), then the user may wish to share his or her voice profile with that particular business entity. When the user calls the call center of that particular entity, the automated voice response system of the call center may then utilize the user's voice profile to improve speech recognition accuracy, thereby improving the overall user experience.

Figure 5:
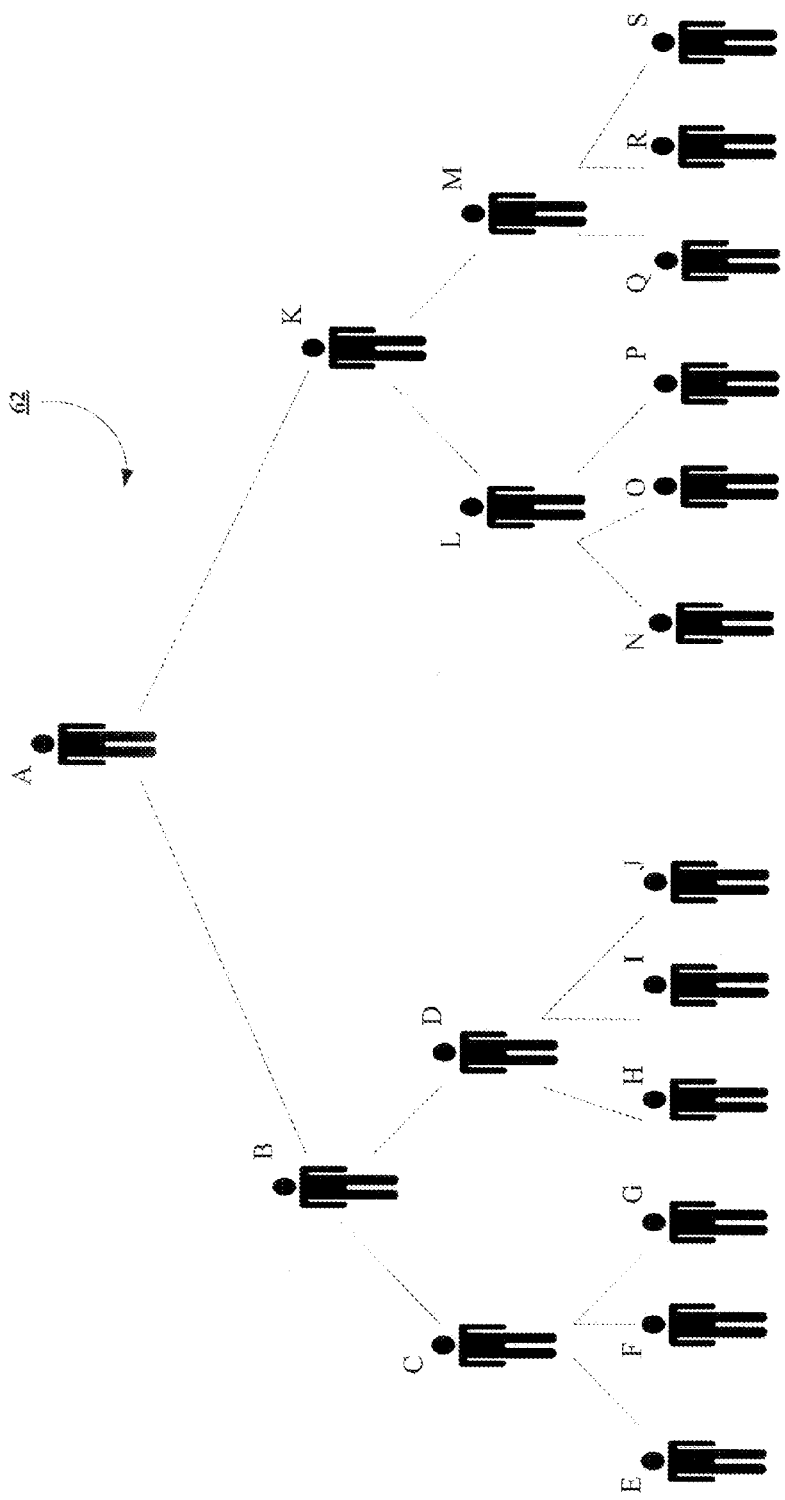
FIGS. 5 and 6 illustrate an example of how portable voice profiles may be shared amongst a hierarchically organized population, according to an embodiment of the invention.

FIG. 5 illustrates a population of people organized into a hierarchical structure. The hierarchical structure may represent the structure of a company or other business entity. As illustrated, person A is at the top of the hierarchical structure, while persons E through J and N through S are at the lowest level of the structure—three levels from person A. One of the problems that exists in any hierarchical structure involves the flow of information. For example, because person A is three levels away from the persons at the lowest level (e.g., persons E through J and N through S), information flowing from person A to person J must pass through two levels, including persons B and D. Information may be lost or changed en route from person A to J. As more and more layers are added to the structure, problems associated with the flow of information increase, as there is insufficient bandwidth available for all the information available at the bottom of the hierarchy to be transmitted to the individuals higher up.

Figure 6:
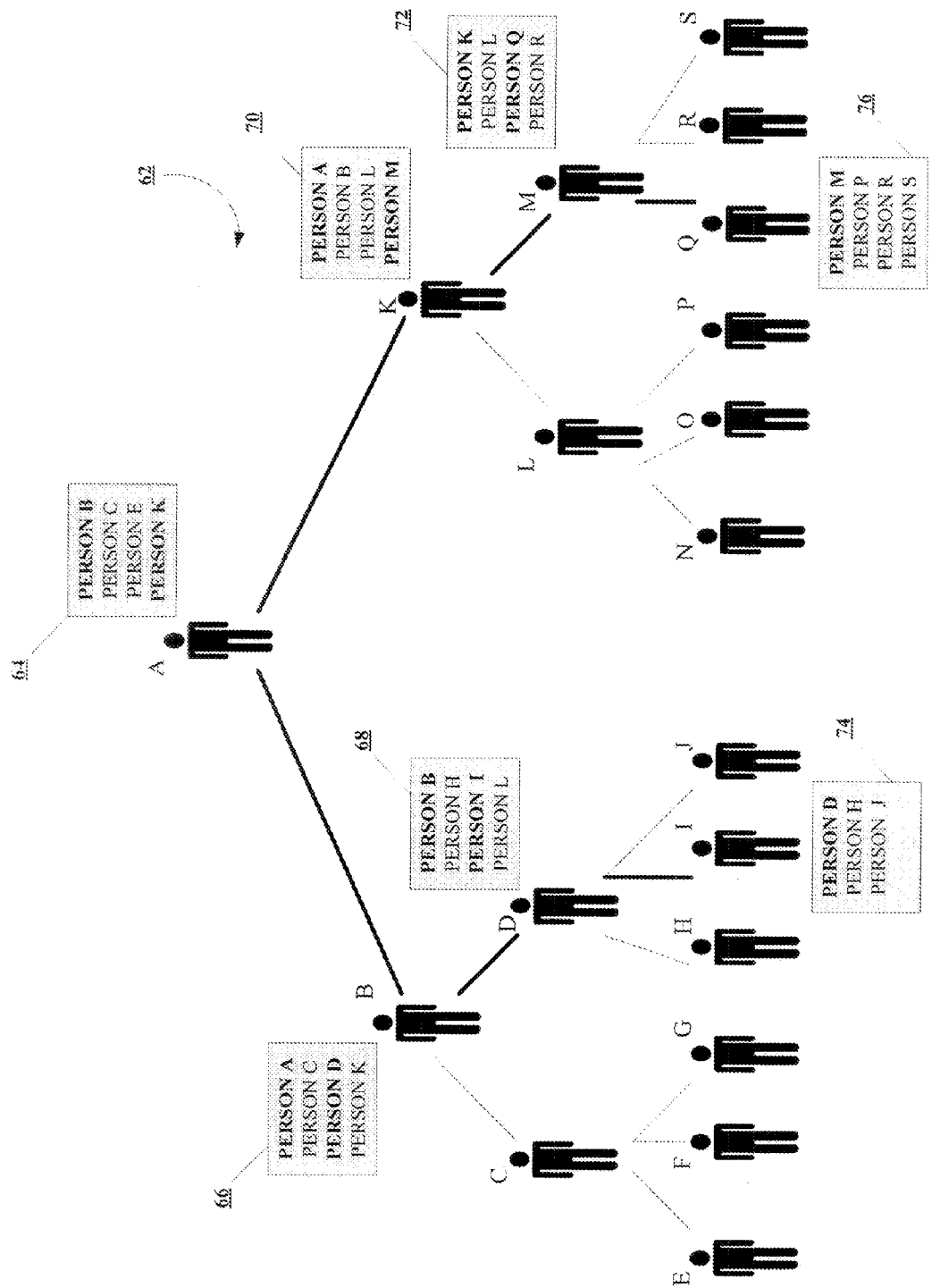

FIG. 6 illustrates how an embodiment of the present invention enables persons within a hierarchical structure to share portable voice profiles. As illustrated in FIG. 6, a group consisting of persons I, D, B, A, K, M and Q has been defined. Next to each person in the group is a voice profile list (e.g., voice profile list 62), listing the voice profiles residing on, or stored at, a speech recognition system 10 owned and operated by person A. Each voice profile list may be maintained and/or managed by the voice profile manager 18 of its respective owner's system 10. Although person M is in the group, it is clear from the illustration of FIG. 6 that person A does not have person M's voice profile stored on person A's system, as person M is not listed in person A's voice profile list. Accordingly, the profile manager 18 of person A's system can retrieve the voice profile of person M by sending a request to person K, who has person M's voice profile stored locally, as indicated in person K's voice profile list. In this way, a group of distributed voice profiles can be shared, and routed to the proper system when needed, or when requested.

Figure 7:
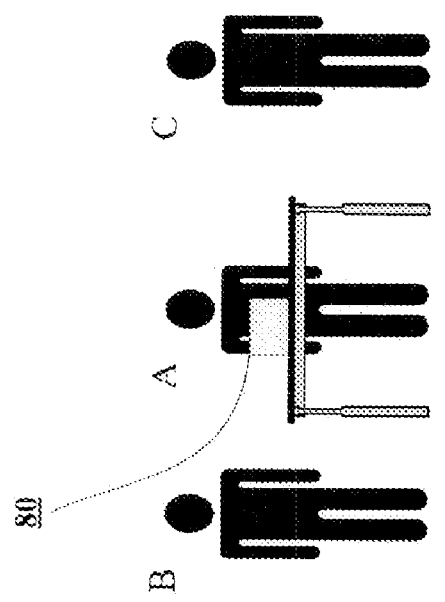
FIG. 7 depicts an example of a single-device, multi-user environment in which an embodiment of the invention may be utilized.

Referring now to FIG. 7, a multi-user, single device environment is shown. In one embodiment of the invention, each user (e.g., users A, B and C) generates and develops his or her own voice profile by utilizing the portable voice profile with one or more application and speech recognition engines. In addition, each user agrees, by means of his or her own local voice profile manager, to exchange portable voice profiles with the other users. For example, user A may grant users B and C permission to access user A's portable voice profile, while user B grants users A and C permission, and so on. Accordingly, each user's voice profile manager automatically negotiates the exchange of voice profiles between and amongst the users. Consequently, user A may utilize his own portable voice profile, as well as user B's portable voice profile, and user C's portable voice profile on one device, such as PDA 80, with a voice recording application.

Figure 8:
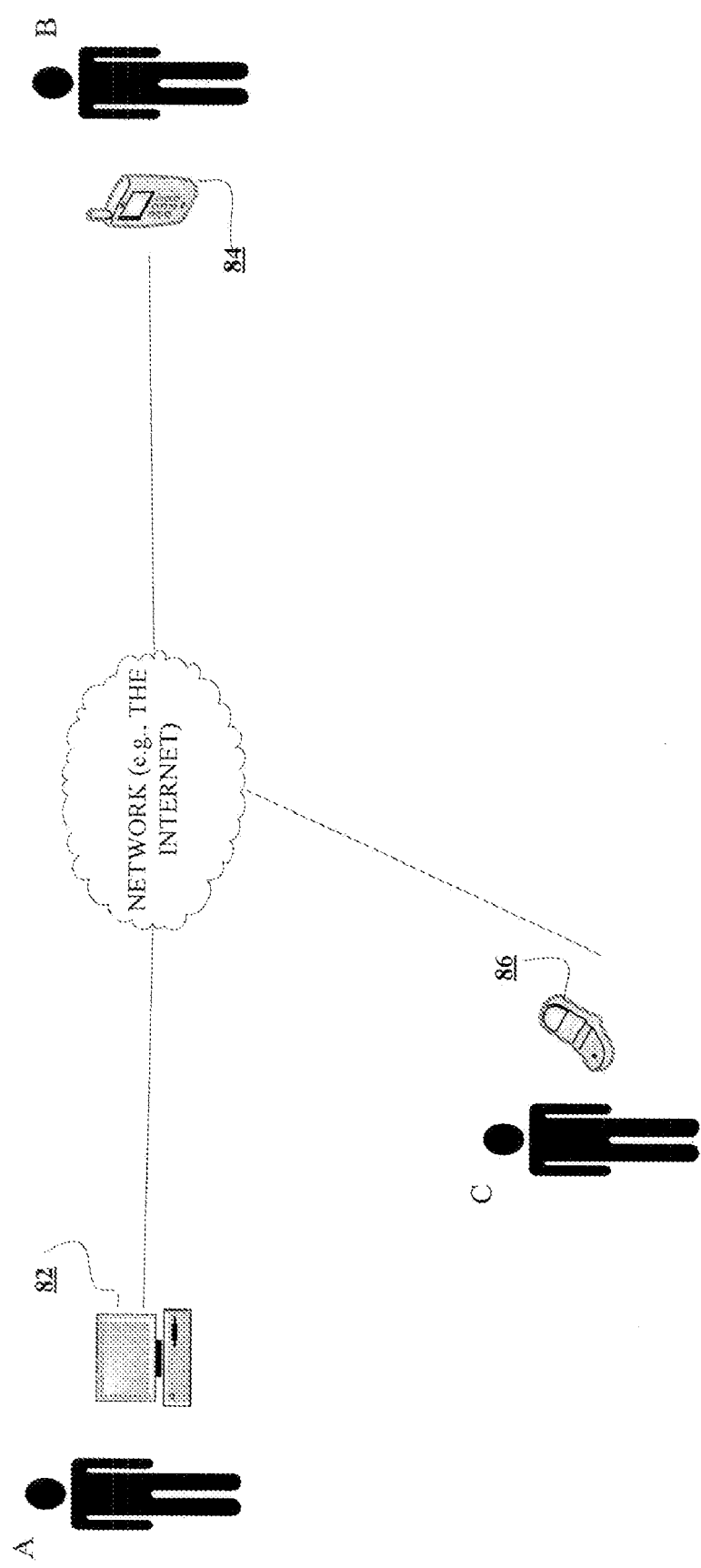
FIG. 8 depicts an example of a multi-device, multi-user, peer-to-peer environment in which an embodiment of the invention may be utilized.

In FIG. 8, a multi-user, multi-device environment is shown. In one embodiment of the invention, each user (e.g., users A, B and C) may utilize a communication device with recording and speech recognition capabilities. Accordingly each user's device, including user A's personal computer 82, user B's wireless VoIP phone 84, and user C's mobile VoIP phone 86, has a locally stored copy of each user's portable voice profile. Therefore, as user B's voice signal is received at user A's personal computer, a speech recognition engine executing at user A's personal computer can process the voice signal using user B's portable voice profile. In one embodiment of the invention, portable voice profiles are exchanged prior to the initiation of a communication session, as described above. Alternatively, voice profiles may be exchanged at the time the communication session is initiated.

Figure 9:
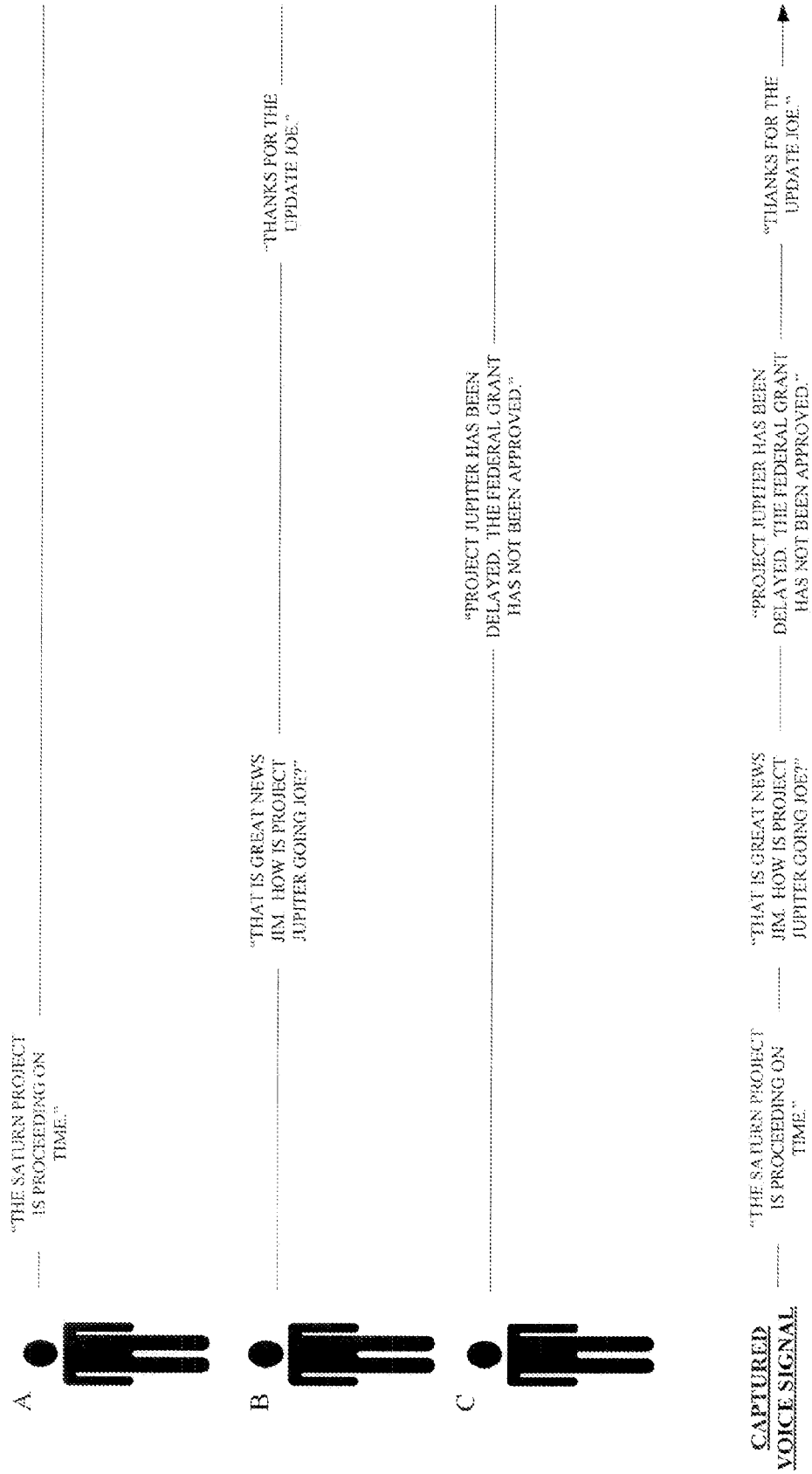
FIGS. 9 and 10 illustrate an example of how a speech recognition system, consistent with an embodiment of the invention, works with a particular application.
Figure 10:
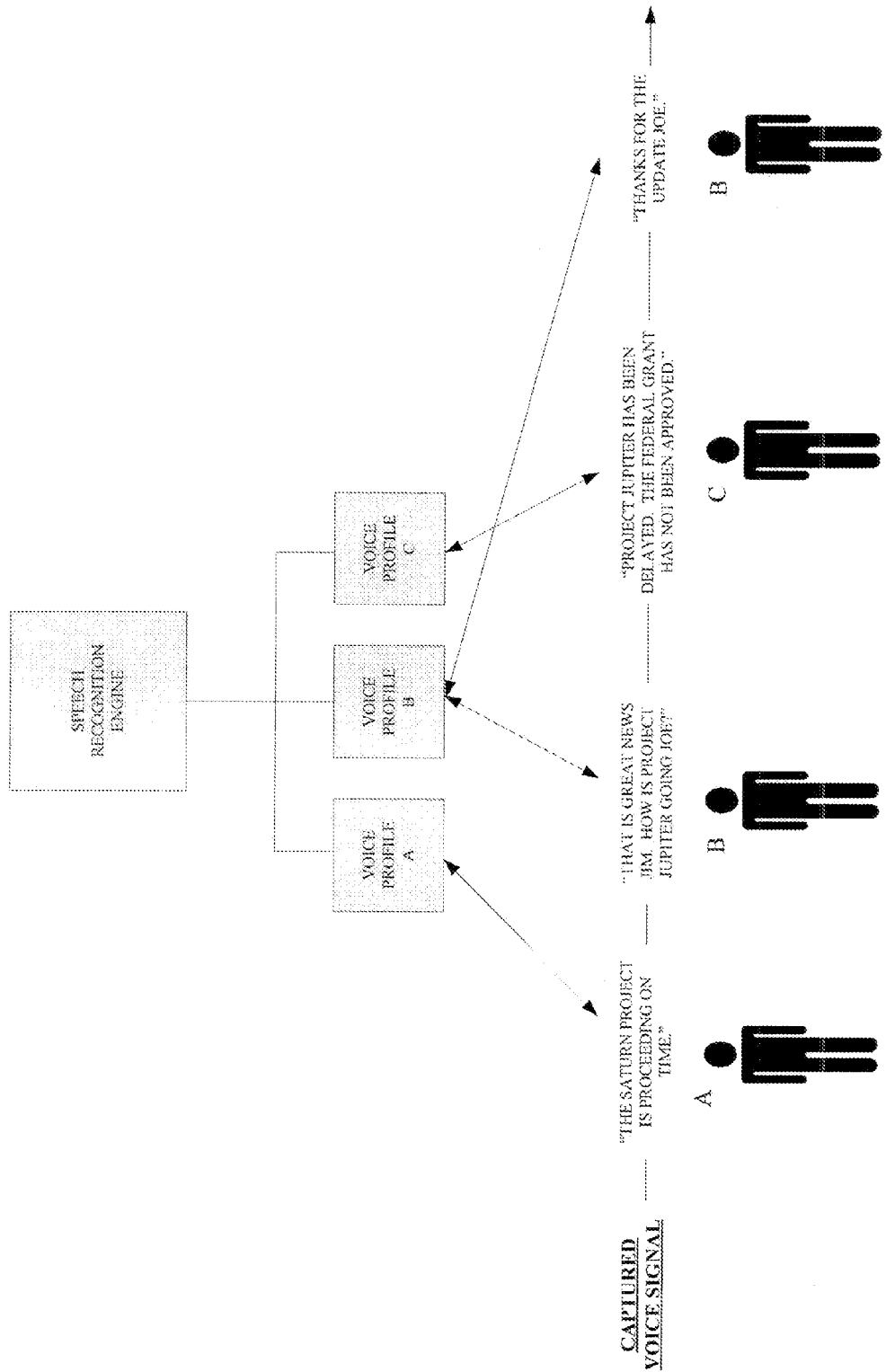

FIGS. 9 and 10 illustrate an example of how a speech recognition system, consistent with an embodiment of the invention, might work in a particular multi-user application. In FIG. 9, an example conversation between users A, B and C is shown. The conversation is captured, by an application, for example, such as the voice recording application on the PDA 80 (FIG. 7), or a VoIP application on the personal computer 82 (FIG. 8). After the application has captured the conversation, the voice recording application processes and passes the recorded voice signal to the speech recognition engine. The speech recognition engine, in turn, can utilize the various portable voice profiles to recognize the words spoken by user A, user B and user C. For example, as illustrated in FIG. 10, user A's speech is processed by the speech recognition engine with user A's portable voice profile, while user B's speech is processed with user B's portable voice profile, and so on. By processing each speaker's speech with his or her own profile, speech recognition accuracy is improved.

As discussed briefly above, one advantage of the present invention is its distributed architecture. Each device of the overall system need not be aware of the location of every user's profile, as each device can query other users' devices in the system to obtain the location, and thus the voice profile, of another user. Accordingly, the system generally has a peer-to-peer architecture. For example, in one embodiment of the invention, each voice profile manager 18 may communicate directly with another voice profile manager to exchange voice profiles. In such a peer-to-peer environment, no centralized server is required. It is possible, however, that a central server or a special purpose peer device facilitates some special functions, such as establishing groups, enforcing secured group access, and monitoring the overall processing and communication load of the system. In an embodiment with a centralized server, each user may subscribe to a service, and select users who have also subscribed to the service, to be members of particular groups. Consequently, the particular architecture of the system (e.g., peer-to-peer, or client server, or the careful integration of the two forms of network topology in a larger system) is a design choice, and depends on the particular features that are desired. Those skilled in the art will appreciate the advantages of each type of architecture.

In one embodiment of the invention, higher level groups may be established and managed by regional, centralized servers. For example, one or more servers may manage high level groups, such as a group including all members residing in a particular city (e.g., New York City, Los Angeles, San Francisco), or all members with a particular voice accent, such as all members with a New York accent. Lower level groups based on more precise data may be managed by each user's group manager 16 on a peer-to-peer basis.

Figure 11:
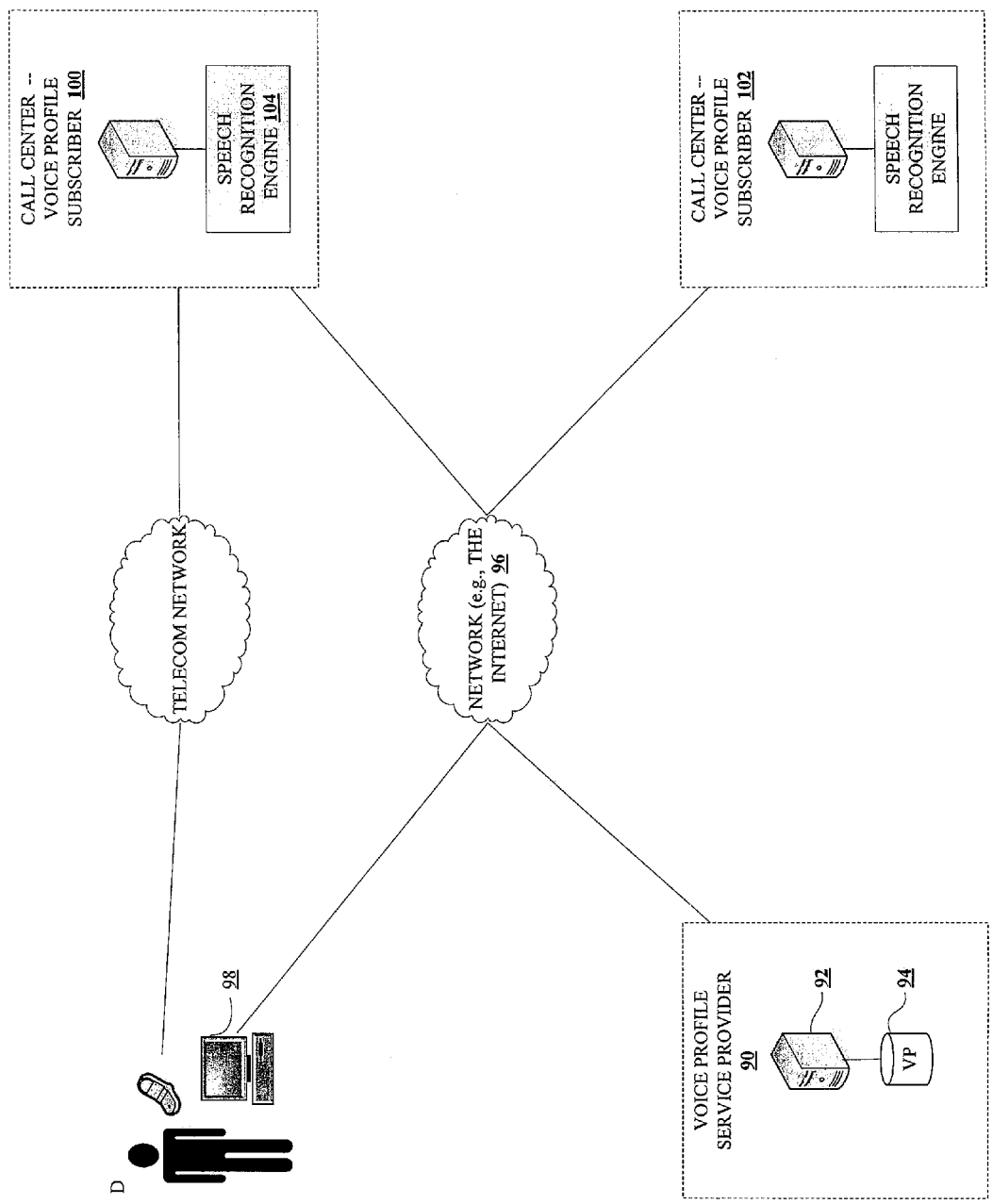
FIG. 11 illustrates an example of a client-server based speech recognition system, consistent with an embodiment of the invention.

A server in an embodiment with a client-server system may facilitate added functionality. For example, FIG. 11 illustrates an example of a client-server based speech recognition system, consistent with an embodiment of the invention. As illustrated in FIG. 11, in one embodiment of the invention, a voice profile service provider 90 operates a server 92 coupled to a storage device 94 for storing portable voice profiles. The voice profile service provider's server 92 is connected to a public network 96, such as the Internet. A user, such as user D, may utilize a conventional web browser executing on a computer 98 to access a web server operated by the voice profile service provider 90. Accordingly, user D may establish a new voice profile with the voice profile service provider 90, by requesting a new voice profile, in which case, the voice profile services provider 90 may prompt user D to input information and/or provide a voice sample. Alternatively, user D may upload an existing portable voice profile that user D has developed with an existing speech recognition system.

After user D has provided the voice profile service provider 90 with a portable voice profile, user D may select to share his portable voice profile with a variety of subscribers (e.g., subscribers 100 and 102). For example, a subscriber may be a business entity that subscribes to a service offered by the voice profile service provider 90. By subscribing to the service, the business entity is granted access to users' voice profiles, which can be used within the business entity's call center to improve speech recognition accuracy when a user (e.g., user D) places a call to the subscriber's call center. As illustrated in FIG. 11, when user D places a call to the call center operated by subscriber 100, a speech recognition engine 104 operated by subscriber 100 can process user D's voice signal using user D's portable voice profile, which was received by the subscriber 100 from the voice profile service provider 90.

In one embodiment of the invention, a subscriber 100 retrieves portable voice profiles when a call is initiated. For example, the subscriber 100 may request the user to enter a telephone number, or some other information suitable for identification, upon which, the subscribe can issued a request for the voice profile associated with the identification information. Alternatively, the subscriber 100 may utilize caller identification information communicated to the call center as part of the communication session. In any case, the subscriber 100 may issue a request to the voice profile service provider 90 for the user's voice profile after the user has provided the identifying information.

In another embodiment of the invention, a subscriber 100 may store voice profiles locally. When storing voice profiles locally, the subscriber 100 may implement a mechanism for automatically updating a user's portable voice profile as it changes over time. For example, the subscriber 100 may periodically poll the voice profile service provider 90 to determine whether a particular voice profile has been updated or otherwise changed. The voice profile service provider may automatically communicate updates to the subscriber 100.

The foregoing description of various implementations of the invention has been presented for purposes of illustration and description. It is not exhaustive and does not limit the invention to the precise form or forms disclosed. A speech recognition system consistent with an embodiment of the invention may take one of several form factors. Furthermore, it will be appreciated by those skilled in the art that the present invention may find practical application in a variety of alternative contexts that have not explicitly been addressed herein. Finally, the illustrative processing steps performed by a computer-implemented program (e.g., instructions) may be executed simultaneously, or in a different order than described above, and additional processing steps may be incorporated. The invention may be implemented in hardware, software, or a combination thereof. Software may be both object-oriented and non-object-oriented. The scope of the invention is defined by the claims and their equivalents.

What is claimed is:

1. An apparatus comprising:
a storage device configured to store portable voice profiles; and
a computer-based system coupled to the storage device, the computer-based system including (1) a speech recognition engine configured to utilize the portable voice profiles in recognizing speech from various speakers, wherein each portable voice profile is associated with and customized to a particular speaker, and enhances an-accuracy with which the speech recognition engine converts the particular speaker's speech to text, and the speech recognition engine includes speaker identification logic to analyze voice signals to identify the particular speaker and then dynamically select a particular portable voice profile associated with the identified speaker; (2) a local group manager-configured to facilitate establishing a local user of the apparatus as a member of a group and to manage access privileges to a portable voice profile associated with the local user according to connections between the local user and other members of the group and instructions of the local user; and (3) a local voice profile manager configured to facilitate an exchange of the portable voice profile associated with the local user with another user that is a member of the group, wherein at least one of the portable voice profiles includes data derived from use with a variety of speech recognition engines.

2. The apparatus of claim 1, wherein the local voice profile manager is further configured to utilize a communication protocol to receive a portable voice profile from a remote apparatus associated with a member of the group to which the local user is a member.

3. The apparatus of claim 1, wherein the local voice profile manager is further configured to utilize a communication protocol to send the portable voice profile associated with the local user of the apparatus to a remote apparatus associated with a member of the group to which the local user is a member.

4. The apparatus of claim 1, wherein the group is initially defined by an administrative application executing on a remote apparatus, and the local group manager provides a listing of all groups to which the local user is allowed to join.

5. The apparatus of claim 4, wherein the group is defined as a secure group by the administrative application executing on the remote apparatus, and the local group manager utilizes cryptographic communication protocols to enable the local user to join the secure group.

6. The apparatus of claim 1, wherein each portable voice profile of the portable voice profiles is received by the local voice profile manager from a remote voice profile manager, wherein each remote voice profile manager communicates a portable voice profile to the local voice profile manager after a speaker associated with the local voice profile manager has agreed to exchange a portable voice profile with a speaker associated with the remote voice profile manager.

7. An apparatus, comprising:
a storage device configured to store a plurality of portable voice profiles; and a computer-based system coupled to the storage device, the computer-based system including (1) a speech recognition engine configured to convert a voice signal to text, the speech recognition engine including speaker identification logic configured to analyze the voice signal to identify the speaker and then dynamically select a particular portable voice profile associated with the identified speaker, in real-time, from the plurality of portable voice profiles; (2) a local group manager configured to manage access privileges to a local user's portable voice profile according to connections between a local user of the apparatus and other members of a group to which the local user belongs and instructions of the local user; and (3) a local voice profile manager configured to receive the plurality of portable voice profiles, each portable voice profile associated with a speaker and including speaker-dependent data accessible to a plurality of speech recognition engines through an interface, the speaker-dependent data to enhance an accuracy with which each speech recognition engine in the plurality of speech recognition engines recognizes spoken words in a voice signal from a speaker associated with a portable voice profile, wherein at least one of the plurality of portable voice profiles includes data derived from use with a variety of speech recognition engines.

8. The apparatus of claim 7, wherein the local group manager is further configured to facilitate establishing the local user of the apparatus as a member of the group, and to facilitate establishing connections with other users as members of the group.

9. The apparatus of claim 7, wherein the speech recognition engine accesses speaker-dependent data from one or more of the plurality of portable voice profiles, and utilizes the speaker-dependent data to enhance the accuracy with which the speech recognition engine converts the voice signal to text.

10. The apparatus of claim 7, wherein the interface is an application programming interface (API), and the speech recognition engine accesses speaker-dependent data from one or more of the plurality of portable voice profiles by making an API function call, and utilizes the accessed speaker-dependent data to enhance the accuracy with which the speech recognition engine converts the voice signal to text.

11. The apparatus of claim 7, wherein the plurality of portable voice profiles are received from a plurality of remote voice profile managers.

12. The apparatus of claim 7, wherein the local voice profile manager is associated with at least one local portable voice profile, and is further configured to automatically communicate the at least one local portable voice profile to a remote voice profile manager when a speaker associated with the local portable voice profile has provided instructions to the local voice profile manager to exchange the local portable voice profile with a speaker associated with the remote voice profile manager.

13. The apparatus of claim 7, wherein each portable voice profile of the plurality of portable voice profiles received by the local voice profile manager are received from a remote voice profile manager, wherein each remote voice profile manager communicates a portable voice profile to the local voice profile manager after a speaker associated with the local voice profile manager has agreed to exchange a portable voice profile with a speaker associated with the remote voice profile manager.

14. The apparatus of claim 13, wherein the local voice profile manager and each remote voice profile manager are associated with a user-interface, and each user-interface is configured to facilitate an exchange of portable voice profiles between speakers associated with different voice profile managers.

15. The apparatus of claim 7, wherein the voice signal is received from one of a plurality of applications, each application configured to generate a voice signal compatible for analysis by any one of the plurality of speech recognition engines.

16. The apparatus of claim 15, wherein the plurality of applications include at least one application from the following group of applications: dictation application, command and control application, multi-user recorder application, multi-user conferencing application, communication-load management application, information update application, and information broadcast application.

17. The apparatus of claim 7, wherein the speaker-dependent data of each portable voice profile includes acoustic characteristics of a speaker associated with the portable voice profile.

18. The apparatus of claim 7, wherein the speaker-dependent data of each portable voice profile is derived from feedback provided by any one of said plurality of speech recognition engines.

19. The apparatus of claim 7, wherein the speaker-dependent data of each portable voice profile is derived without explicit training and is updated over time.

20. The apparatus of claim 7, wherein the portable voice profiles are communicated directly over a peer-to-peer network.

21. The apparatus of claim 7, wherein the portable voice profiles are communicated indirectly over a client-server network.

22. The apparatus of claim 7, wherein the portable voice profiles are communicated indirectly over a hybrid network.

23. A computer-implemented method comprising:
facilitating establishing a user as a member of a group using a group manager module of a speech recognition system executing on a computer-based platform;
automatically exchanging portable voice profiles, using said group manager module with at least one other user who is a member of the group provided said exchanges are permitted by access control privileges for the portable voice profiles established by owners thereof, said access control privileges accounting for connections between an owner of a portable voice profile and other members of a group to which the owner belongs and instructions of the owner, wherein at least one of the portable voice profiles includes data derived from use with a variety of speech recognition engines;
using at least one of the portable voice profiles to determine a current speaker within a voice recording; and
utilizing said at least one of the portable voice profiles within a speech recognition process to convert a speech recording to text.

24. The method of claim 23, wherein the portable voice profiles are exchanged over a network, and each portable voice profile is associated with a speaker and includes speaker-dependent data accessible to a plurality of speech recognition engines through an interface, the speaker-dependent data to enhance an accuracy with which each speech recognition engine in the plurality of speech recognition engines recognizes spoken words in recorded speech from a respective speaker associated with a respective portable voice profile.

* * * * *